(12) United States Patent
Otsuka et al.

(10) Patent No.: US 11,061,138 B2
(45) Date of Patent: Jul. 13, 2021

(54) DISTANCE MEASURING DEVICE AND METHOD OF MEASURING DISTANCE BY USING THE SAME

(71) Applicant: SAMSUNG ELECTRONICS CO., LTD., Suwon-si (KR)

(72) Inventors: Tatsuhiro Otsuka, Suwon-si (KR); Jungwoo Kim, Hwaseong-si (KR); Heesun Yoon, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 474 days.

(21) Appl. No.: 15/983,788

(22) Filed: May 18, 2018

(65) Prior Publication Data

US 2019/0187257 A1  Jun. 20, 2019

(30) Foreign Application Priority Data

Dec. 19, 2017 (KR) .......................... 10-2017-0175298

(51) Int. Cl.
| | | |
|---|---|---|
| *G01S 17/10* | (2020.01) | |
| *G01S 7/4865* | (2020.01) | |
| *G01S 7/4863* | (2020.01) | |
| *G01S 17/89* | (2020.01) | |

(52) U.S. Cl.
CPC ............ *G01S 17/10* (2013.01); *G01S 7/4863* (2013.01); *G01S 7/4865* (2013.01); *G01S 17/89* (2013.01)

(58) Field of Classification Search
CPC .... G01S 7/4863; G01S 7/4865; G01S 7/5345; G01S 7/529; G01S 7/489; G01S 7/4868
See application file for complete search history.

(56) References Cited

U.S. PATENT DOCUMENTS

| | | | | |
|---|---|---|---|---|
| 3,896,411 | A * | 7/1975 | Mackey | G01S 7/527 367/98 |
| 6,393,377 | B1 * | 5/2002 | Shirai | G01S 7/487 702/159 |
| 7,379,016 | B1 * | 5/2008 | McEwan | G01S 17/14 342/134 |
| 9,684,066 | B2 | 6/2017 | Bartolome et al. | |
| 2011/0272559 | A1 * | 11/2011 | Woolaway | G01S 7/4863 250/214 R |

FOREIGN PATENT DOCUMENTS

| | | |
|---|---|---|
| JP | 2018-66201 A | 4/2018 |
| KR | 10-2002-0059868 A | 7/2002 |
| KR | 10-1044000 B1 | 6/2011 |

* cited by examiner

*Primary Examiner* — Eric L Bolda
(74) *Attorney, Agent, or Firm* — Sughrue Mion, PLLC

(57) ABSTRACT

Provided are a distance measuring device and a distance measuring method of measuring a distance to an object by amplifying an electrical signal using a gain that varies the level of the electrical signal and detecting a peak of the amplified electrical signal.

16 Claims, 7 Drawing Sheets

DISTANCE MEASURING DEVICE AND METHOD OF MEASURING DISTANCE BY USING THE SAME

CROSS-REFERENCE TO RELATED PATENT APPLICATION

This application claims priority from Korean Patent Application No. 10-2017-0175298, filed on Dec. 19, 2017, in the Korean Intellectual Property Office, the disclosure of which is incorporated herein in its entirety by reference.

BACKGROUND

1. Field

Apparatuses and methods consistent with exemplary embodiments relate to a distance measuring device for measuring a distance, and a method of measuring a distance by using the same.

2. Description of the Related Art

One method of measuring a distance to an object by using a 3D camera or light detection and ranging (LIDAR) is a time of flight (TOF) method that measures the time required for light to travel between an object and a camera. The TOF method includes processes of radiating light of a specific wavelength onto an object; measuring or capturing an image of light of the specific wavelength reflected by the object by using a photodiode or a camera; and extracting a depth image from the measured or captured image.

SUMMARY

One more exemplary embodiments may provide a distance measuring device and a method of measuring a distance by using the same. Additional exemplary aspects will be set forth in part in the description which follows and, in part, will be apparent from the description, or may be learned by practice of the presented exemplary embodiments.

According to an aspect of an exemplary embodiment, a distance measuring device includes a light receiver configured to detect light reflected from an object and to output an electrical signal corresponding to the detected light; a variable gain amplifier configured to amplify the electrical signal using a gain that varies according to a level of the electrical signal; a peak detector configured to detect a peak in the amplified electrical signal; and a processor configured to measure a distance to the object using the peak.

The variable gain amplifier may include a delaying circuit configured to delay the electrical signal for a certain time period; a gain controller configured to detect the level of the electrical signal and generate a gain control signal corresponding to the detected level, within the certain time period; and a gain-controlled amplifier configured to amplify the electrical signal delayed for the certain time period, according to a gain that is controlled by the gain control signal.

The gain controller may include an amplifier configured to amplify the electrical signal according to a predetermined gain; an envelope detector configured to detect an envelope signal of the electrical signal amplified according to the predetermined gain and detect the level of the electrical signal; a comparator configured to compare the envelope signal with a preset reference to determine whether the peak has occurred; and a sampling and holding (S/H) circuit configured to perform S/H on the envelope signal and generate the gain control signal.

The comparator may be further configured to generate a peak generation signal when the envelope signal exceeds the preset reference, the processor may be further configured to generate a sampling signal corresponding to the peak generation signal, and the S/H circuit may be further configured to generate the gain control signal such that the gain control signal corresponds to the sampling signal.

The variable gain amplifier may be further configured to control the gain to decrease, when the level of the electrical signal increases.

The level of the electrical signal may be an amplitude of a voltage signal.

The light receiver may include a light detector configured to detect the light and to output a current corresponding to the detected light; and a current-voltage converter configured to convert the current into a voltage and to output the voltage as the electrical signal.

The light detector may include at least one of an avalanche photo diode (APD) and a single photon avalanche diode (SPAD).

The peak detector may detect the peak using a constant fraction discriminator (CFD) method.

The distance measuring device may further include a light source configured to output a laser pulse toward the object.

According to an aspect of another exemplary embodiment, a distance measuring method, performed by a distance measuring device, includes detecting light reflected from an object and outputting an electrical signal corresponding to the detected light; amplifying the electrical signal using a gain that varies according to a level of the electrical signal; detecting a peak in the amplified electrical signal; and measuring a distance to the object using the peak.

According to an aspect of another exemplary embodiment, a non-transitory computer-readable recording medium has recorded thereon a computer program, which, when executed by a computer, performs the distance measuring method.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Exemplary embodiments of the present disclosure will now be described more fully with reference to the accompanying drawings. The various embodiments below are only to specify the technical contents and are not to restrict or limit the right scope of the present disclosure. Matters which could be readily inferred by one of ordinary skill in the art to which the present disclosure pertains from the detailed description and the various embodiments belong to the scope of the present disclosure.

The terms "configured" or "include," as used herein, should not be construed as not necessarily requiring all of the several components or several steps described, and should be construed as possibly including additional components or steps. The terms " . . . unit" and " . . . module," when used in this specification, refer to a unit in which at least one function or operation is performed, and which may be implemented as hardware, software, or a combination of hardware and software.

While such terms as "first" "second" etc., may be used to describe various components, these terms are used only to distinguish one component from another.

Figure 1:
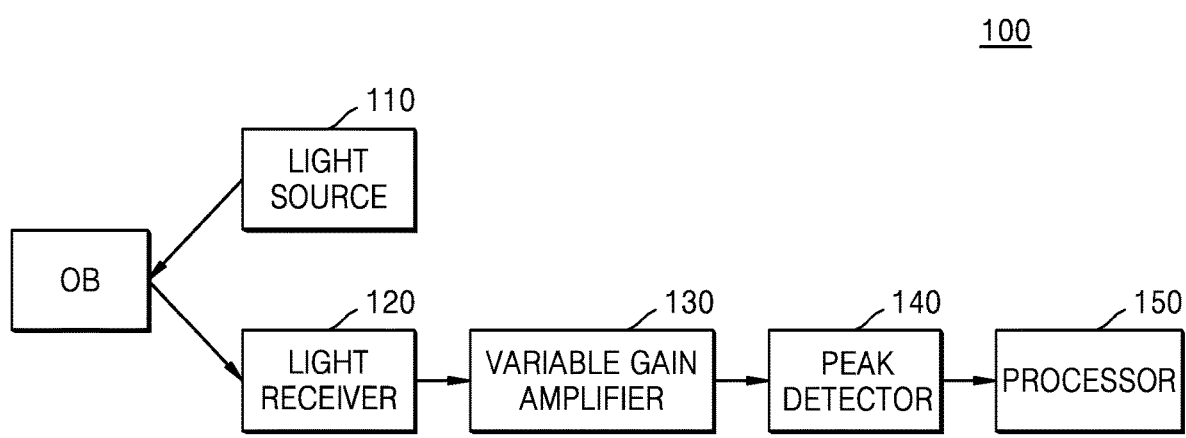
FIG. 1 is a block diagram of a distance measuring device according to an exemplary embodiment.

FIG. 1 is a block diagram of a distance measuring device 100 according to an exemplary embodiment.

The distance measuring device 100 may be utilized as a sensor that obtains three-dimensional (3D) information, such as distance information about a distance to an object in front of the distance measuring device 100, in real time. For example, the distance measuring device 100 is applicable for use with unmanned cars, self-driving cars, robots, and drones. For example, the distance measuring device 100 may be a light detection and ranging (LiDAR) device. The distance measuring device 100 may measure a distance to an object by using any of various types of lasers, such as a near-infrared semiconductor laser, when using a 3D camera or LiDAR.

The distance measuring device 100 may include a light source 110, a light receiver 120, a variable gain amplifier 130, a peak detector 140, and a processor 150. Only components related to the present embodiment, from among the components of the distance measuring device 100, are shown in FIG. 1. It will be understood by one of ordinary skill in the art of the present embodiment that general-use components other than the components illustrated in FIG. 1 may be further included.

The light source 110 may radiate light toward an object OB. The light source 110 may generate and radiate pulsed light or continuous light. The light source 110 may generate and radiate light beams in any of a plurality of different wavelength bands. For example, the light source 110 may emit light having an infrared wavelength. When a light source that emits light having an infrared wavelength is used, light from the light source may be distinguishable from natural, visible light, such as sunlight. However, the light emitted from the light source 110 is not limited to light having an infrared wavelength, and light having any of various wavelengths may be emitted. In this case, a correction may be used for removing information of mixed natural light. For example, the light source 110 may be a laser light source, but is not limited thereto. The light source 110 may be one of an edge emitting laser, a vertical-cavity surface emitting laser (VCSEL), and a distributed feedback laser. For example, the light source 110 may be a laser diode. The light source 110 may be any of various types of lasers, such as a near-infrared semiconductor laser. As necessary, the light source 110 may be included in another device, and is not necessarily hardware included within the distance measuring device 100.

The light receiver 120 may detect light reflected or scattered by the object OB to thereby output an electric signal. For example, the light receiver 120 may convert the light reflected or scattered by the object OB into a voltage signal.

The variable gain amplifier 130 may amplify the electrical signal by using a gain that varies according to a level of the electrical signal. For example, the variable gain amplifier 130 may detect the level of the electrical signal output by the light receiver 120, and may control a gain to correspond to the detected level of the electrical signal. The variable gain amplifier 130 may control the gain so that the detected level of the electrical signal is inversely proportional to the gain. According to an exemplary embodiment, when the detected level of the electrical signal increases, the variable gain amplifier 130 may control the gain to decrease. According to another exemplary embodiment, when the detected level of the electrical signal decreases, the variable gain amplifier 130 may control the gain to increase. Then, the variable gain amplifier 130 may amplify the electrical signal by using the gain that is controlled.

Accordingly, the distance measuring device 100 may amplify the electrical signal by the gain varying according to the level of the electrical signal and thus prevent saturation of the electrical signal. For example, when the object OB is located near the distance measuring device 100 or the object OB has a large refractive index, the level of the electrical signal output by the light receiver 120 may be large, and thus, when the distance measuring device 100 amplifies the electrical signal by using an existing gain, the amplified electrical signal may exceed a dynamic range. In this case, the distance measuring device 100 amplifies the electrical signal output by the light receiver 120 by using a small gain when the level of the electrical signal is large, thereby preventing saturation of the electrical signal. In addition, because the distance measuring device 100 may prevent saturation of the electrical signal, the distance measuring device 100 may more accurately measure a distance to an object.

The peak detector 140 may detect a peak from an amplified electrical signal obtained by the variable gain amplifier 130. The peak detector 140 may detect a peak by detecting a central position of the electrical signal. Alternatively, the peak detector 140 may detect a peak by analogically detecting a width of the electrical signal. Alternatively, the peak detector 140 may detect a peak by detecting a rising edge and a falling edge of a digital signal after converting the electrical signal into the digital signal. Alternatively, the peak detector 140 may detect a peak by using a constant fraction discriminator (CFD) method of detecting a zero-crossing point by dividing an electrical signal into a plurality of signals, inverting and time-delaying some of the plurality of signals, and then combining the some signals with the remaining signals. A circuit that detects a peak by using the CFD method may be referred to as a CFD circuit. The peak detector 140 may further include a comparator, and thus, may output the detected peak as a pulse signal.

The processor 150 may control the operation of each of the components of the distance measuring device 100. The distance measuring device 100 may include a memory that stores a program and other data for operations performed by the processor 150.

The processor 150 may measure a distance to the object OB by using the peak detected by the peak detector 140. For example, the processor 150 may measure a distance to the object OB by measuring a time period between a time at which light is radiated by the light source 110 and a time at which the peak is detected by the peak detector 140. A method of measuring distance by using a peak is a well-known technique in the art, and thus, a detailed description is omitted herein.

Figure 2:
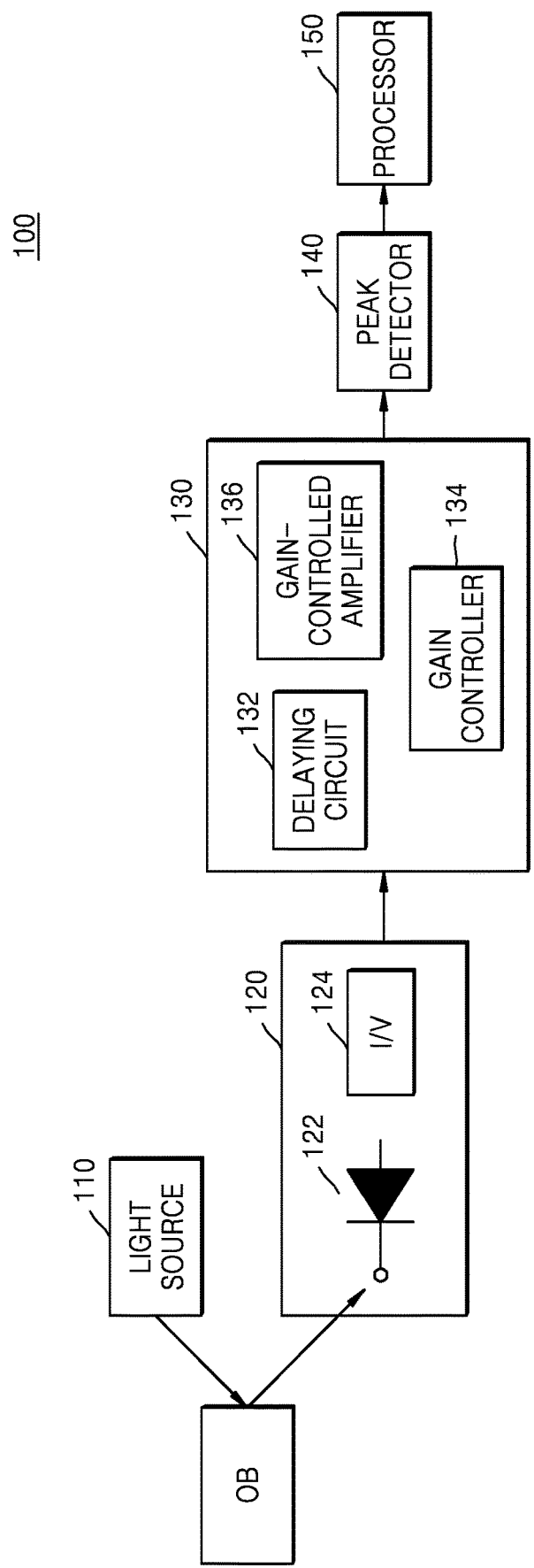
FIG. 2 is a block diagram illustrating the distance measuring device of FIG. 1 in greater detail.

FIG. 2 is a block diagram illustrating the distance measuring device 100 in greater detail.

The light receiver 120 may include a light detector 122 configured to output an electrical signal, for example, a current, corresponding to the light, and a current-voltage (I/V) conversion circuit 124 configured to convert the current output by the light detector 122 into a voltage. In addition to the above, the light receiver 120 may further include a lens that focuses the light reflected by the object OB, and a filter (for example, a high-pass filter) that filters an electrical signal of a specific frequency.

The light detector 122 may be a light-receiving diode and may operate in a state in which a bias voltage Vbias is applied thereto. For example, the light detector 122 may include an avalanche photo diode (APD) or a single photon avalanche diode (SPAD). The light detector 122 may be configured by a practical circuit in another way, for example, the light detector 122 may include an analog front end (AFE) or a time digital counter (TDC), depending on which one of the APD and the SPAD is included as a light-receiving diode in the light detector 122. The configuration of the practical circuitry of the light detector 122 may be a well-known technique in the art, and thus, a detailed description thereof is omitted herein.

The variable gain amplifier 130 may include a delaying circuit 132, a gain controller 134, and a gain-controlled amplifier 136.

The delaying circuit 132 may delay the electrical signal output by the light receiver 120, for a certain time period.

The gain controller 134 may detect the level of the electrical signal output by the light receiver 120, and may generate a gain control signal corresponding to the detected level, within the certain time period. In other words, the gain controller 134 may generate the gain control signal corresponding to the detected level, in order to control a gain of the gain-controlled amplifier 136. The gain controller 134 may generate the gain control signal such that a magnitude of the gain control signal is proportional to a magnitude of the level of the electrical signal. For example, the gain controller 134 may detect an amplitude of the voltage signal output by the light receiver 120, and may generate a gain control signal having a magnitude corresponding to the detected amplitude of the voltage signal. Then, the gain controller 134 may control the gain of the gain-controlled amplifier 136 via the gain control signal.

The gain-controlled amplifier 136 may amplify the electrical signal delayed for the certain time period, according to the gain that is controlled by the gain control signal. In detail, the gain-controlled amplifier 136 may determine a gain corresponding to the gain control signal of the gain controller 134 and may amplify the electrical signal delayed for the certain time period according to the determined gain. The gain of the gain-controlled amplifier 136 may depend on the magnitude of the gain control signal. For example, the magnitude of the gain control signal and the magnitude of the gain may be inversely proportional to each other. In other words, as the magnitude of the gain control signal increase, the magnitude of the gain may decrease.

While the distance measuring device 100 is delaying the electrical signal for the certain time period by using the delaying circuit 132, the distance measuring device 100 may generate the gain control signal corresponding to the level of the electrical signal by using the gain controller 134. The distance measuring device 100 may amplify the electrical signal delayed for the certain time period by controlling the gain of the gain-controlled amplifier 136 via the gain control signal. Accordingly, the distance measuring device 100 controls, via the gain control signal, the gain of the gain-controlled amplifier 136 to be small, when the level of the electrical signal output by the light receiver 120 is large, thereby preventing saturation of the electrical signal.

Figure 3:
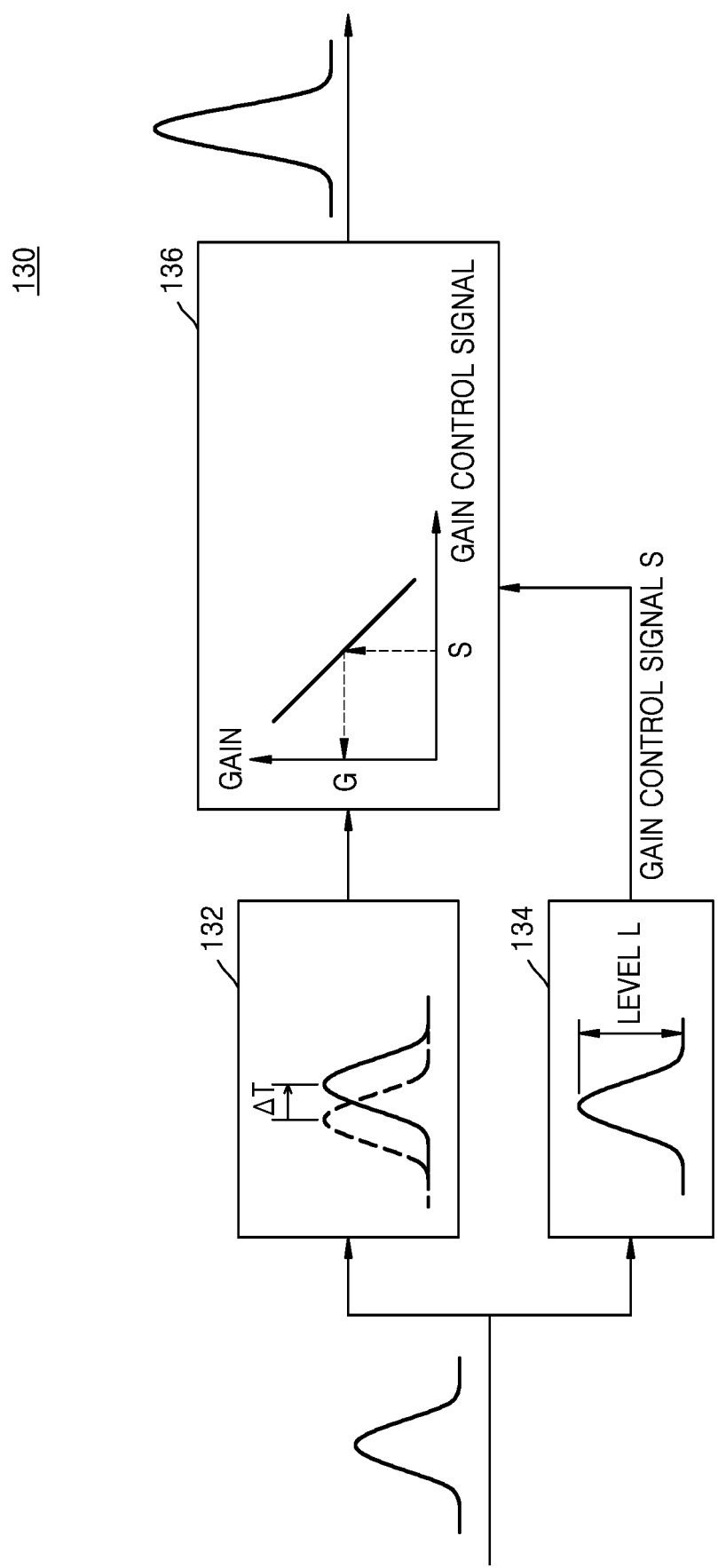
FIG. 3 illustrates an exemplary embodiment of operations of a gain controller included in the distance measuring device of FIG. 1.

FIG. 3 illustrates an exemplary embodiment of operations of the gain controller 134.

The electrical signal output by the light receiver 120 may be input into both the delaying circuit 132 and the gain controller 134.

The delaying circuit 132 may delay the electrical signal for a certain time period $\Delta T$.

The gain controller 134 may detect a level L of the electrical signal and may generate a gain control signal S corresponding to the detected level L, within the certain time period $\Delta T$.

The gain-controlled amplifier 136 may determine a gain G corresponding to the gain control signal S and may amplify the electrical signal delayed for the certain time period $\Delta T$ according to the determined gain G. Thus, the gain-controlled amplifier 136 may output an amplified electrical signal.

When an electrical signal having a level larger than the level L of the electrical signal L is input, the gain controller 134 may generate a gain control signal having a magnitude larger than the magnitude of the gain control signal S. In this way, because the magnitude of the gain control signal S and the magnitude of the gain G are inversely proportional to each other, the gain-controlled amplifier 136 amplifies the electrical signal according to a gain having a magnitude smaller than the gain G.

Likewise, when an electrical signal having a level smaller than the level L of the electrical signal L is input, the gain-controlled amplifier 136 may amplify the electrical signal according to a gain having a magnitude larger than the gain G.

Figure 4:
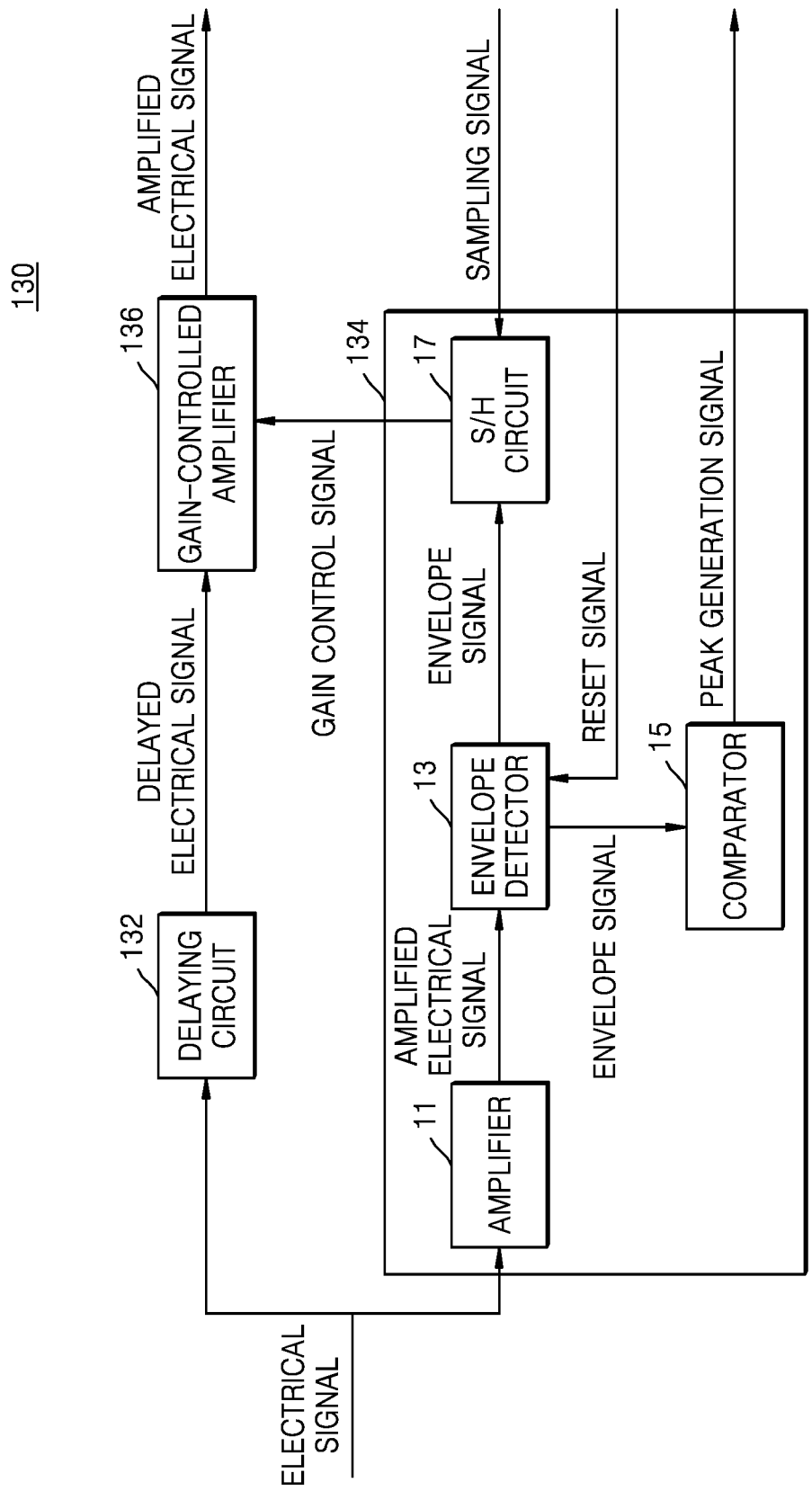
FIG. 4 is a block diagram illustrating the gain controller in greater detail.

FIG. 4 is a block diagram illustrating the gain controller 134 in greater detail.

The gain controller 134 may include an amplifier 11, an envelope detector 13, a comparator 15, and a sampling and holding (S/H) circuit 17.

The amplifier 11 may amplify the electrical signal output by the light receiver 120 according to a preset gain. In detail, in order for the envelope detector 13 to facilitate detection of an envelope signal for the electrical signal, the amplifier 11 may amplify the electrical signal according to the preset gain.

The envelope detector 13 may detect the envelope signal of the amplified electrical signal obtained by the amplifier 11 and thus may detect the level of the electrical signal.

The comparator 15 may compare the envelope signal with a preset reference to thereby determine whether a peak has occurred. For example, when the magnitude of the envelope signal exceeds the preset reference, the comparator 15 may determine that a peak has occurred. Accordingly, the comparator 15 may generate a peak generation signal. The comparator 15 may transmit the generated peak generation signal to the processor 150.

When the peak generation signal is generated, the S/H circuit 17 may perform S/H on the envelope signal to thereby generate the gain control signal. For example, in response to the peak generation signal of the comparator 15, the processor 150 may generate a sampling signal and transmit the sampling signal to the S/H circuit 17. In response to the sampling signal of the processor 150, the S/H circuit 17 may perform S/H on the envelope signal to generate the gain control signal. The S/H circuit 17 may perform S/H according to a method of sampling the envelope signal and holding a result of the sampling for a certain time period.

Then, the gain-controlled amplifier 136 may amplify the electrical signal delayed for the certain time period, according to a gain that is controlled by the gain control signal generated by the S/H circuit 17.

In addition, the envelope detector 13 may reset the envelope signal according to a reset signal. In detail, the envelope detector 13 may receive a reset signal from the processor 150 and reset the envelope signal according to the reset signal. Accordingly, the envelope detector 13 may detect an envelope signal of a next electrical signal output by the light receiver 120. In other words, because the envelope signal has been reset, even when a magnitude of the next electrical signal output by the light receiver 120 is smaller than the magnitude of the previous electrical signal, the envelope detector 13 may detect the envelope signal of the next electrical signal.

Figure 5:
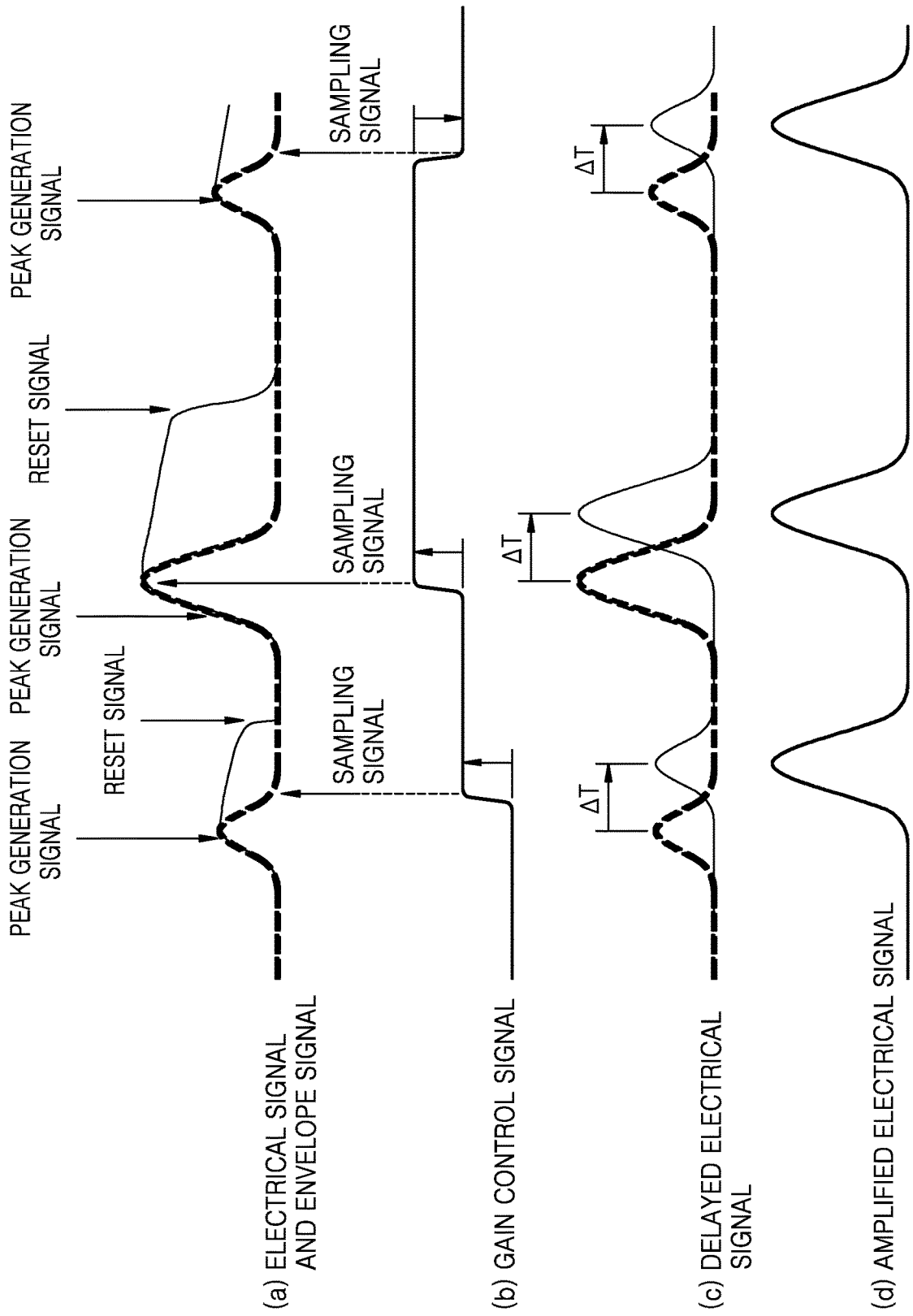
FIGS. 5 and 6 illustrate an exemplary embodiment of operations of a variable gain amplifier included in the distance measuring device of FIG. 1 operates.
Figure 6:
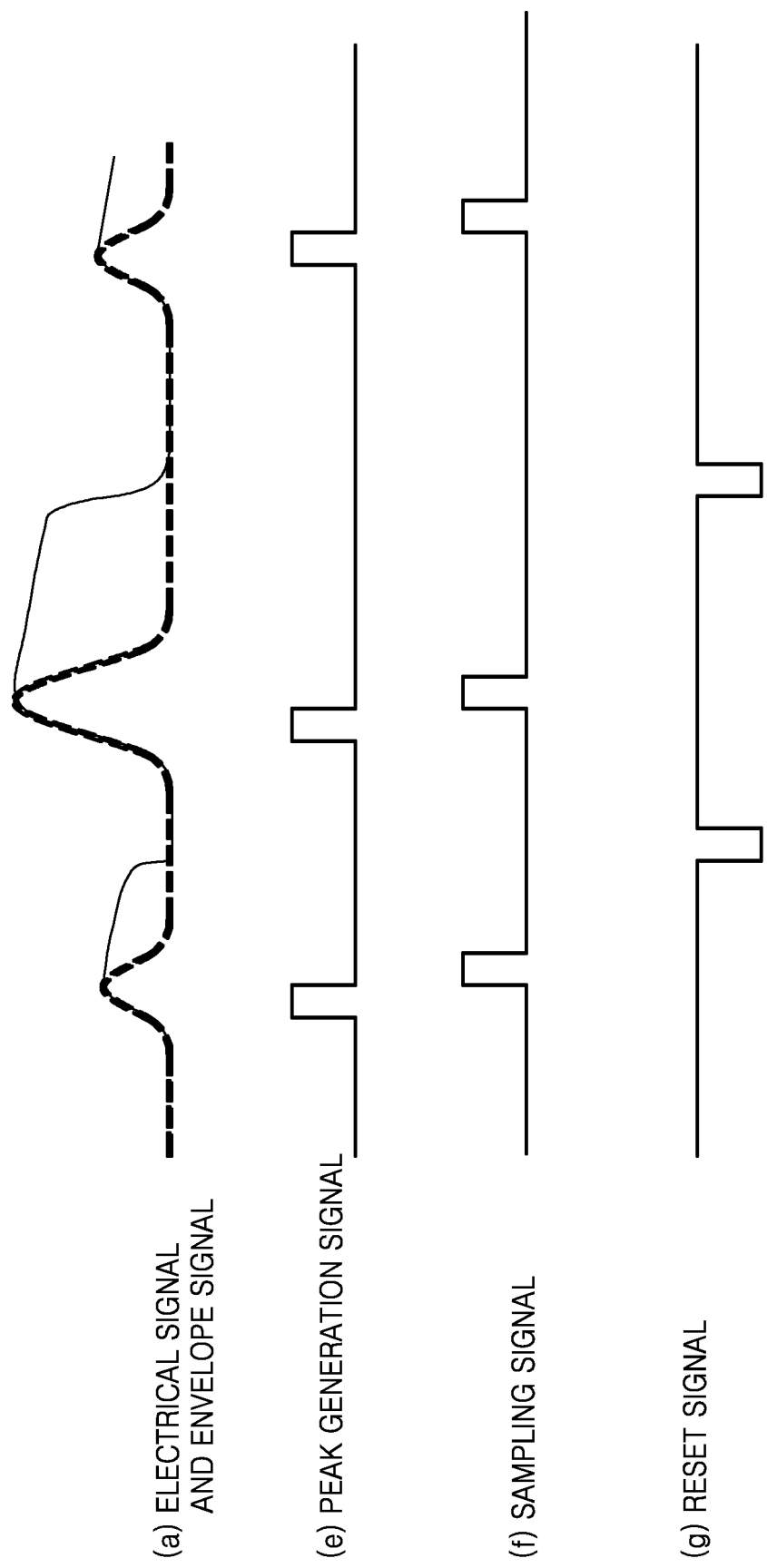

FIGS. 5 and 6 illustrate an exemplary embodiment of operations of the variable gain amplifier 136.

In FIGS. 5 and 6, signals indicated by reference characters (a) through (g) refer to signals that proceed in a time domain.

The signal indicated by a dotted line in (a) of FIGS. 5 and 6 refers to the electrical signal output by the light receiver 120, and the signal indicated by a solid line in (a) of FIGS. 5 and 6 refers to the envelope signal of the electrical signal detected by the envelope detector 13. The reference character (a) of FIGS. 5 and 6 represents detection of three electrical signals and an envelope signal.

When the envelope signal exceeds the preset reference, the comparator 15 may generate a peak generation signal as shown in (e) of FIG. 6, and transmit the peak generation signal to the processor 150. Then, the processor 150 may generate a sampling signal as shown in (f) of FIG. 6, and transmit the sampling signal to the S/H circuit 17.

According to the sampling signal as shown in (f) of FIG. 6, the S/H circuit 17 may perform S/H on the envelope signal and thus generate a gain control signal as shown in (b) of FIG. 5. In detail, referring to (b) of FIG. 5, the S/H circuit 17 may sample an envelope signal of a first electrical signal, increase a magnitude of the gain control signal according to a result of the first sampling, and then may maintain the increased magnitude. Then, the S/H circuit 17 may sample an envelope signal of a second electrical signal, increase a magnitude of the gain control signal because a result of the second sampling is greater than the result of the first sampling, and then may maintain the increased magnitude. Then, the S/H circuit 17 may sample an envelope signal of a third electrical signal, decrease a magnitude of the gain control signal because a result of the third sampling is smaller than the result of the second sampling, and then may maintain the decreased magnitude.

Then, the gain-controlled amplifier 136 may amplify a delayed electrical signal obtained due to delaying for the certain time period $\Delta T$ as shown in (c) of FIG. 5, according to a gain that is controlled by the gain control signal as shown in (b). Consequently, the gain-controlled amplifier 136 may output an amplified electrical signal as shown in (d) of FIG. 5. When the electrical signals as shown in (c) and (d) are compared with each other, although the level of the second electrical signal is greater than that of the first electrical signal, the gain applied to the second electrical signal is smaller than that applied to the first electrical signal (in other words, the gain control signal applied to the second electrical signal is greater than that applied to the first electrical signal), and thus saturation of the second electrical signal may be prevented.

After transmitting the sampling signal as shown in (f) to the S/H circuit 17, the processor 150 may generate a reset signal as shown in (g) of FIG. 6 and transmit the reset signal to the envelope detector 13. The envelope detector 13 may reset the envelope signal according to the reset signal as shown in (g). Thus, because the envelope signal is reset after being sampled by the S/H circuit 17, the envelope detector 13 may sequentially detect envelope signals of different electrical signals for which levels vary.

Figure 7:
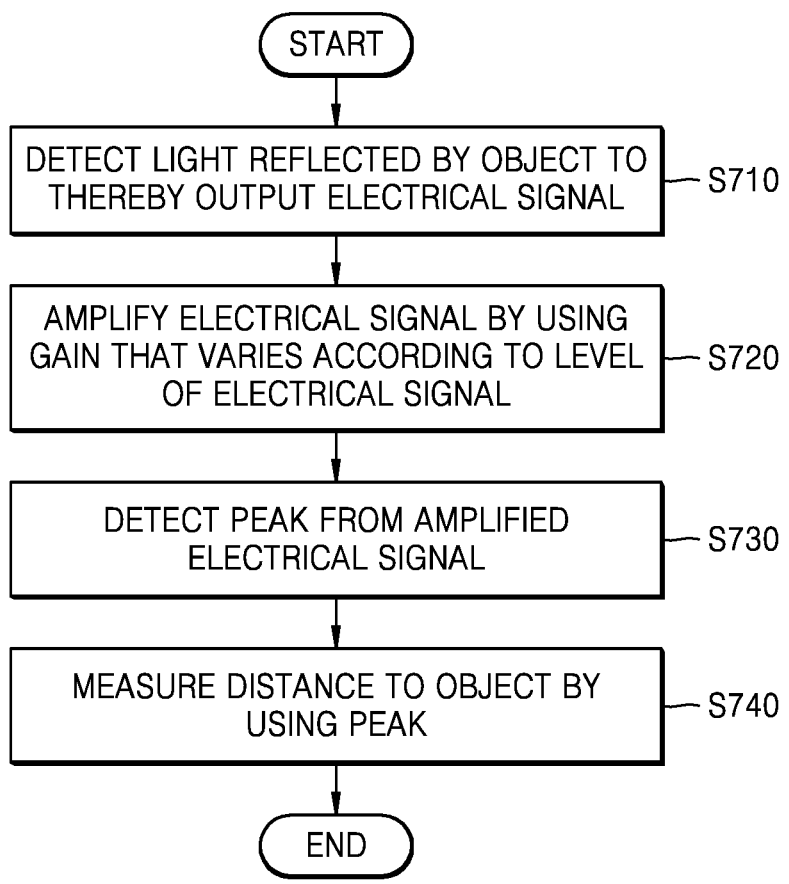
FIG. 7 is a flowchart of a method of measuring a distance, according to an exemplary embodiment.

FIG. 7 is a flowchart of a method of measuring a distance, according to an exemplary embodiment.

The method of FIG. 7 may be performed by the components of the distance measuring device 100 of FIGS. 1 through 4, and a redundant description thereof will be omitted here.

In operation S710, the distance measuring device 100 may detect light reflected by an object to thereby output an electrical signal. For example, the distance measuring device 100 may output an electrical signal corresponding to the light reflected by the object, for example, a current by using a light detector, and convert the output current into a voltage and output the voltage by using a current-voltage conversion circuit.

In addition, the distance measuring device 100 may radiate light toward the object by using a light source and detect light reflected by the object to thereby output an electrical signal.

In operation S720, the distance measuring device 100 may amplify the electrical signal by using a gain that varies according to a level of the electrical signal. For example, the distance measuring device 100 may detect the level of the electrical signal output in operation S710, and may control the gain to correspond to the detected level of the electrical signal.

The distance measuring device 100 may delay the electrical signal output in operation S710 for a certain time period. The distance measuring device 100 may detect the level of the electrical signal output in operation S710, and may generate a gain control signal corresponding to the detected level of the electrical signal, within the certain time period. The distance measuring device 100 may generate the gain control signal such that a magnitude of the gain control signal is proportional to a magnitude of the level of the electrical signal. In detail, the distance measuring device 100 may amplify the electrical signal output in operation S710 according to a preset gain and detect an envelope signal of the amplified electrical signal to thereby detect the level of the electrical signal. The distance measuring device 100 may compare the envelope signal with a preset reference to thereby determine whether a peak has occurred. When a peak has occurred, the distance measuring device 100 may perform S/H on the envelope signal to thereby generate a gain control signal.

The distance measuring device 100 may amplify the electrical signal delayed for the certain time period, according to the gain that is controlled by the gain control signal. In detail, the distance measuring device 100 may determine a gain corresponding to the gain control signal and may amplify the electrical signal delayed for the certain time period, according to the determined gain. The gain may depend on a magnitude of the gain control signal. For example, the magnitude of the gain control signal and the magnitude of the gain may be inversely proportional to each other.

In operation S730, the distance measuring device 100 may detect a peak from an amplified electrical signal obtained in operation S730. For example, the distance measuring device 100 may detect a peak by using a constant fraction discriminator (CFD) method of detecting a zero-crossing point by dividing an electrical signal into a plurality of signals, inverting and time-delaying some of the plurality of signals, and then combining the some signals with the remaining signals.

In operation S740, the distance measuring device 100 may measure a distance to the object by using the peak. For example, the distance measuring device 100 may measure a distance to the object by measuring a time period between a time at which light is radiated and a time at which the peak is detected.

According to the present exemplary embodiments, a distance measuring device may amplify an electrical signal by using a gain that varies according to the level of the electrical signal, and thus prevent saturation of the electrical signal.

The devices described herein may comprise a processor, a memory for storing program data and executing it, a permanent storage unit such as a disk drive, a communications port for handling communications with external devices, and user interface devices, including a touch panel, keys, buttons, etc. For example, when software modules or algorithms are involved, these software modules may be stored as computer readable codes executable on the processor or as program instructions in a computer-readable recording medium. Examples of the computer-readable recording medium include magnetic storage media (e.g., read-only memory (ROM), random-access memory (RAM), floppy disks, hard disks, etc.), and optical recording media (e.g., CD-ROMs, or Digital Versatile Discs (DVDs)). The computer readable recording medium can also be distributed over network coupled computer systems so that the computer readable code is stored and executed in a distributed manner. This media can be read by the computer, stored in the memory, and executed by the processor.

The present exemplary embodiments may be described in terms of functional block components and various processing steps. Such functional blocks may be realized by any number of hardware and/or software components configured to perform the specified functions. For example, exemplary embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present exemplary embodiments may be implemented with any programming or scripting language such as C, C++, Java, assembler language, or the like, with the various algorithms being implemented with any combination of data structures, objects, processes, routines or other programming elements. The functional blocks may be implemented in algorithms that are executed on one or more processors. Furthermore, the exemplary embodiments described herein could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples and are not intended to otherwise limit the scope of the disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of the terms "a" and "an" and "the" and similar referents in the disclosure (especially in the context of the following claims) are to be construed to cover both the singular and the plural. Furthermore, recitation of ranges of values herein are merely intended to serve as each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. The use of any and all examples, or exemplary language (e.g., "such as") provided herein, is intended merely to better illuminate the inventive concept and does not pose a limitation on the scope of the inventive concept unless otherwise claimed. It will be apparent to one of ordinary skill in the art that numerous modifications and adaptations may be made according to design conditions or factors without departing from the accompanying claims or their equivalents.

The exemplary embodiments should be considered in descriptive sense only and not for purposes of limitation. Descriptions of features or aspects within each embodiment should typically be considered as available for other similar features or aspects in other embodiments.

While the disclosure has been presented with reference to exemplary embodiments, it will be understood by those of ordinary skill in the art that various changes in form and details may be made therein without departing from the spirit and scope of the inventive concept as defined by the following claims.

What is claimed is:

1. A distance measuring device comprising:
    a light receiver configured to detect light reflected from an object and to output an electrical signal corresponding to the detected light;
    a variable gain amplifier configured to amplify the electrical signal using a gain that varies according to a level of the electrical signal;
    a peak detector configured to detect a peak in the amplified electrical signal; and
    a processor configured to measure a distance to the object using the peak,
    wherein the variable gain amplifier comprises:
        a delaying circuit configured to delay the electrical signal for a certain time period,
        a gain controller configured to detect the level of the electrical signal and generate a gain control signal corresponding to the detected level, within the certain time period; and
        a gain-controlled amplifier configured to amplify the electrical signal delayed for the certain time period, according to a gain that is controlled by the gain control signal, and
    wherein the controller comprises:
        an amplifier configured to amplify the electrical signal according to a predetermined gain;

an envelope detector configured to detect an envelope signal of the electrical signal amplified according to the predetermined gain and to detect the level of the electrical signal;
a comparator configured to compare the envelope signal with a preset reference and to determine whether the peak has occurred; and
a sampling and holding (S/H) circuit configured to perform S/H on the envelope signal and to generate the gain control signal.

2. The distance measuring device of claim 1, wherein
the comparator is further configured to generate a peak generation signal when the envelope signal exceeds the preset reference,
the processor is further configured to generate a sampling signal corresponding to the peak generation signal, and
the S/H circuit is further configured to generate the gain control signal such that the gain control signal corresponds to the sampling signal.

3. The distance measuring device of claim 1, wherein the variable gain amplifier is further configured to control the gain to decrease, when the level of the electrical signal increases.

4. The distance measuring device of claim 1, wherein the level of the electrical signal is an amplitude of a voltage signal.

5. The distance measuring device of claim 1, wherein the light receiver comprises:
a light detector configured to detect the light and to output a current corresponding to the detected light; and
a current-voltage converter configured to convert the current into a voltage and to output the voltage as the electrical signal.

6. The distance measuring device of claim 5, wherein the light detector comprises at least one of an avalanche photo diode (APD) and a single photon avalanche diode (SPAD).

7. The distance measuring device of claim 1, wherein the peak detector detects the peak using a constant fraction discriminator (CFD) method.

8. The distance measuring device of claim 1, further comprising a light source configured to output a laser pulse toward the object.

9. A distance measuring method, performed by a distance measuring device, the distance measuring method comprising:
detecting light reflected from an object;
outputting an electrical signal corresponding to the detected light;
amplifying the electrical signal using a gain that varies according to a level of the electrical signal;
detecting a peak in the amplified electrical signal; and
measuring a distance to the object using the peak,
wherein the amplifying comprises:
delaying the electrical signal for a certain time period;
detecting the level of the electrical signal and generating a gain control signal corresponding to the detected level, within the certain time period; and
amplifying the electrical signal delayed for the certain time period, according to a gain that is controlled by the gain control signal, and
wherein the generating the gain control signal comprises:
amplifying the electrical signal according to a predetermined gain;
detecting an envelope signal of the electrical signal amplified according to the predetermined gain;
detecting the level of the electrical signal;
comparing the envelope signal with a preset reference and thereby determining whether the peak has occurred; and
performing sampling and holding (S/H) on the envelope signal and thereby generating the gain control signal.

10. The distance measuring method of claim 9, wherein the generating the gain control signal comprises:
generating a peak generation signal when the envelope signal exceeds the preset reference;
generating a sampling signal corresponding to the peak generation signal; and
generating the gain control signal such that the gain control signal corresponds to the sampling signal.

11. The distance measuring method of claim 9, wherein the amplifying comprises controlling the gain to decrease, when the level of the electrical signal increases.

12. The distance measuring method of claim 9, wherein the outputting comprises:
detecting the light;
outputting a current corresponding to the detected light; and
converting the current into a voltage and outputting the voltage as the electrical signal.

13. The distance measuring method of claim 12, wherein the detecting the light comprises detecting the light using at least one of an avalanche photo diode (APD) and a single photon avalanche diode (SPAD).

14. The distance measuring method of claim 9, wherein the detecting the peak comprises detecting the peak using a constant fraction discriminator (CFD) method.

15. The distance measuring method of claim 9, further comprising outputting a laser pulse toward the object.

16. A non-transitory computer-readable recording medium having recorded thereon a computer program, which, when executed by a computer, performs a distance measuring method comprising:
detecting light reflected from an object;
outputting an electrical signal corresponding to the detected light;
amplifying the electrical signal using a gain that varies according to a level of the electrical signal;
detecting a peak in the amplified electrical signal; and
measuring a distance to the object using the peak,
wherein the amplifying comprises:
delaying the electrical signal for a certain time period;
detecting the level of the electrical signal and generating a gain control signal corresponding to the detected level, within the certain time period; and
amplifying the electrical signal delayed for the certain time period, according to a gain that is controlled by the gain control signal, and
wherein the generating the gain control signal comprises:
amplifying the electrical signal according to a predetermined gain;
detecting an envelope signal of the electrical signal amplified according to the predetermined gain;
detecting the level of the electrical signal;
comparing the envelope signal with a preset reference and thereby determining where the peak has occurred; and
performing sampling and holding (S/H) on the envelope signal and thereby generating the gain control signal.

* * * * *